United States Patent
Natanzon et al.

(10) Patent No.: US 8,712,962 B1
(45) Date of Patent: Apr. 29, 2014

(54) SNAPSHOTS IN DE-DUPLICATION

(75) Inventors: Assaf Natanzon, Tel Aviv (IL); David C. Dysert, Holliston, MA (US); Sujit S. Naik, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 179 days.

(21) Appl. No.: 13/308,877

(22) Filed: Dec. 1, 2011

(51) Int. Cl.
*G06F 17/30* (2006.01)

(52) U.S. Cl.
USPC .......................................................... 707/634

(58) Field of Classification Search
USPC .......................................... 707/634; 711/162
See application file for complete search history.

(56) References Cited

U.S. PATENT DOCUMENTS

| | | | |
|---|---|---|---|
| 7,516,287 B2 * | 4/2009 | Ahal et al. | 711/162 |
| 7,603,529 B1 * | 10/2009 | MacHardy et al. | 711/162 |
| 8,261,068 B1 * | 9/2012 | Raizen et al. | 713/165 |
| 2003/0023811 A1 * | 1/2003 | Kim et al. | 711/114 |
| 2003/0131182 A1 * | 7/2003 | Kumar et al. | 711/5 |
| 2003/0188114 A1 * | 10/2003 | Lubbers et al. | 711/162 |
| 2005/0228835 A1 * | 10/2005 | Roa | 707/204 |
| 2006/0182050 A1 * | 8/2006 | Dohm | 370/312 |
| 2007/0180167 A1 * | 8/2007 | Tan et al. | 710/74 |
| 2010/0082715 A1 * | 4/2010 | Dohm et al. | 707/822 |
| 2010/0122248 A1 * | 5/2010 | Robinson et al. | 718/1 |
| 2012/0011336 A1 * | 1/2012 | Saika | 711/162 |
| 2012/0124307 A1 * | 5/2012 | Ashutosh et al. | 711/162 |

OTHER PUBLICATIONS

Related U.S. Appl. No. 12/969,903—Notice of Allowance, mailed on Sep. 11, 2013.*
Related U.S. Appl. No. 13/248,926—Notice of Allowance, mailed on May 22, 2013.*

* cited by examiner

*Primary Examiner* — Sheree Brown
(74) *Attorney, Agent, or Firm* — Krishnendu Gupta; Joseph D'Angelo

(57) ABSTRACT

In a first embodiment, a method and computer program product for use in replication comprising pushing a point in time (PIT) to a de-duplication device, creating a virtual LUN based on the PIT pushed to the de-duplication device, and exposing, via a Data Protection Appliance (DPA), the virtual LUN. In a second embodiment, a method and computer program product for use in replication comprising choosing an object to be recovered at a point in time (PI), spawning a virtual machine, creating a virtual LUN based on the PIT, exposing the virtual LUN to the virtual machine, recovering the object from the PIT mounted to the virtual machine, and un-exposing the virtual LUN to the virtual machine.

21 Claims, 14 Drawing Sheets

SNAPSHOTS IN DE-DUPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to co-pending US Patent Application, filed Sep. 29, 2011, Ser. No. 13/248,918 entitled "SNAPSHOTS IN DE-DUPLICATION," which is hereby incorporated by reference in its entirety. This application is related to co-pending US Patent Application, filed Sep. 29, 2011, Ser. No. 13,248,926 entitled "SNAPSHOTS IN DE-DUPLICATION," which is hereby incorporated by reference in its entirety.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In a first embodiment, a method and computer program product for use in replication comprising pushing a point in time (PIT) to a de-duplication device, creating a virtual LUN based on the PIT pushed to the de-duplication device, and exposing, via a Data Protection Appliance (DPA), the virtual LUN. In a second embodiment, a method and computer program product for use in replication comprising choosing an object to be recovered at a point in time (PI), spawning a virtual machine, creating a virtual LUN based on the PIT, exposing the virtual LUN to the virtual machine, recovering the object from the PIT mounted to the virtual machine, and un-exposing the virtual LUN to the virtual machine.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
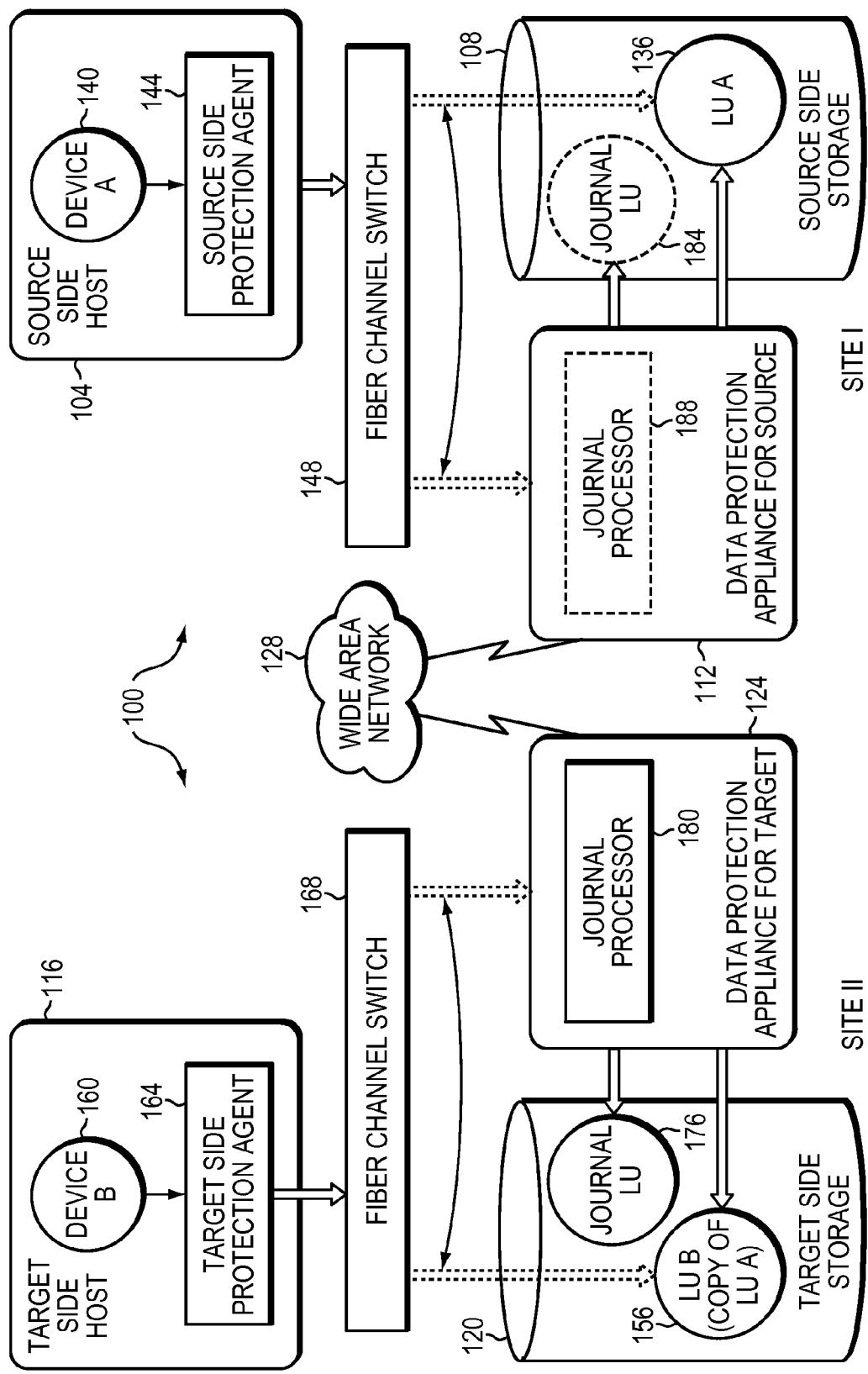
FIG. 1 is a simplified illustration of a data protection system, in accordance with an embodiment of the present disclosure.

Usually, it is beneficial to back-up production site data to a disaster recovery site. Conventionally, disaster recovery sites may use de-duplication to limit the amount of data needed to be stored. Typically, to implement data de-duplication on a system with replication, the backup software scans all the data on the backed-up devices as the device does not know which blocks have changed. Generally, this requires the backup software to scan all the data and transmit all the data to the de-duplication device. This continual scanning and transmission conventionally may take a long time and a large amount of bandwidth.

In an embodiment of the current disclosure, replication snapshots from the production site may be pushed to the de-duplication system at selected times from a replication device to a de-duplication device. In some embodiments, a file may be created for each volume to be backed up. In certain embodiments, backup may occur from a replica copy on the storage array or recovery appliance. In certain embodiments, the backup on the replication device may copy the file content to the replica copy. In at least some embodiments, the replication device may takes a snapshot of the files on the backup device and track the changes to the volumes. In most embodiments, when the next time to push the data arrives, the replication device may push the location changes. In further embodiments, a protocol between the replication device and the backup device may assure that transfer between the devices is optimized.

The following definitions are employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
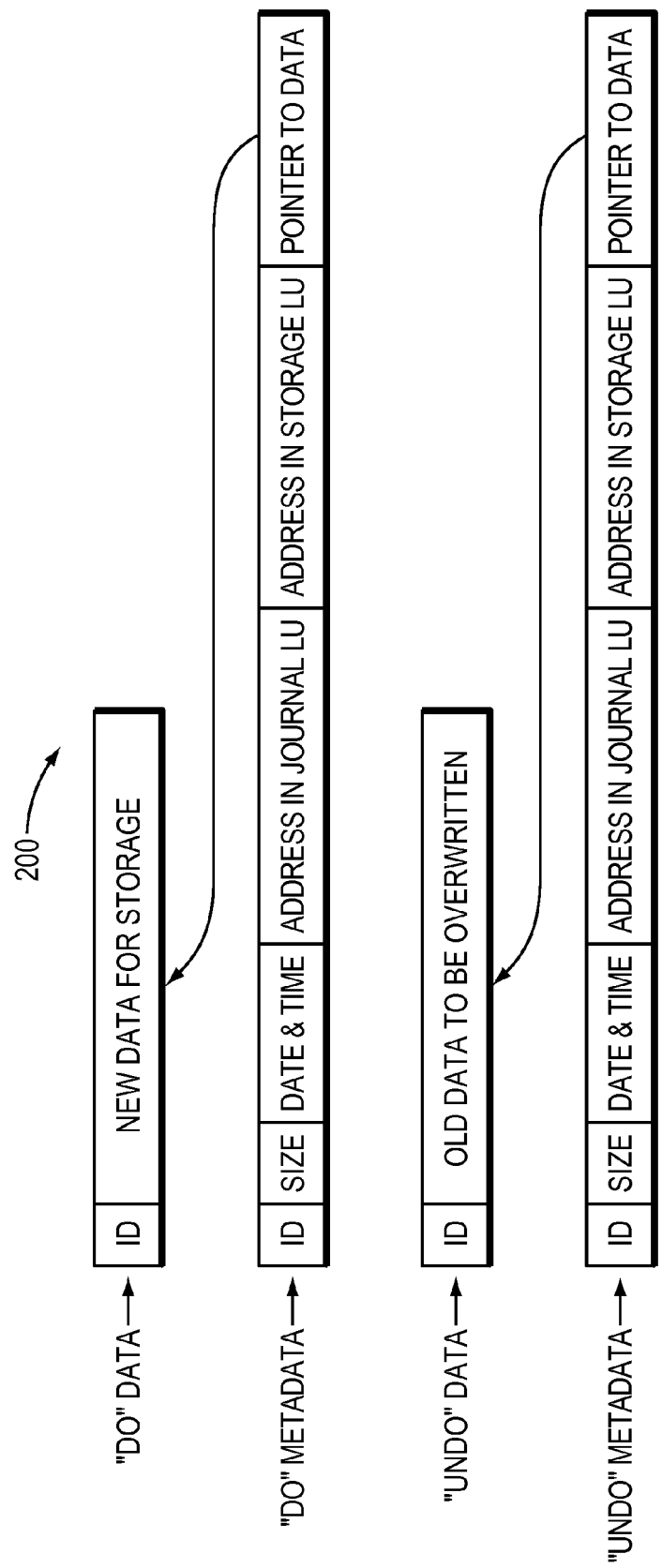
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:

one or more identifiers;

a time stamp, which is the date & time at which the transaction was received by source side DPA 112;

a write size, which is the size of the data block;

a location in journal LU 176 where the data is entered;

a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g., DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replication site to the replica.

De-Duplication and Data Replication

In some embodiments data replication may function in a data de-duplication environment. In certain embodiments, the data replication device may enable the data de-duplication to function more efficiently. In an embodiment, a snapshot of the data being de-duplicated may be sent to the de-duplication device. In some embodiments, changes to the image or snapshot may be tracked and sent to the de-duplication device. In further embodiments, data sent to the de-duplication device may be accessed. In still further embodiments, there may be different configurations of replication and de-duplication devices that enable the data to be sent to the de-duplication device.

Creating a Snapshot of the De-Duplicated Data

In an embodiment of the current disclosure, a data duplication device or software may back up the system at the LUN level. In certain embodiments, a replication device in the system to be backed-up may have a consistency group. In most embodiments, each consistency group may have a number of volumes. In some embodiments, the replication device may create, for each volume, a file on the de-duplication device with the same size as the volume. In certain embodiments, a replication device may take a snapshot and send it to the de-duplication device. In other embodiments, a snapshot may be created on the a storage array and sent it to the de-duplication device. In most embodiments, all the data in the first snapshot may be sent to the de-duplication device. In most embodiments, the snapshot may be an application consistent snapshot. For example, in some embodiments, a database may be quiesced or an application may be placed in a consistent space.

In certain embodiments, an image in a continuous replication environment may be pushed, which may pausing the 5 phase distribution and may pushing the changes from the volume or the journal to the de-duplication device.

Moving Changes from Image to De-Duplication Device

In at least some embodiments, snapshots may be periodically taken of the data being de-duplicated. In some embodiments, the snapshot may be taken by the storage array. In certain embodiments, the storage may determine the differences between the snapshots and send the difference to the de-duplication device. In other embodiments, the storage may take the snapshot and the replication device, which has been tracking the changes between the snapshots, may send the differences between the snapshots to the de-duplication device. In further embodiments, the replication device may take the snapshot and push the changes to the de-duplication device. In yet further embodiments, such as described above, the replication device may push the snapshot to the de-duplication device while processing other replication.

Figure 3:
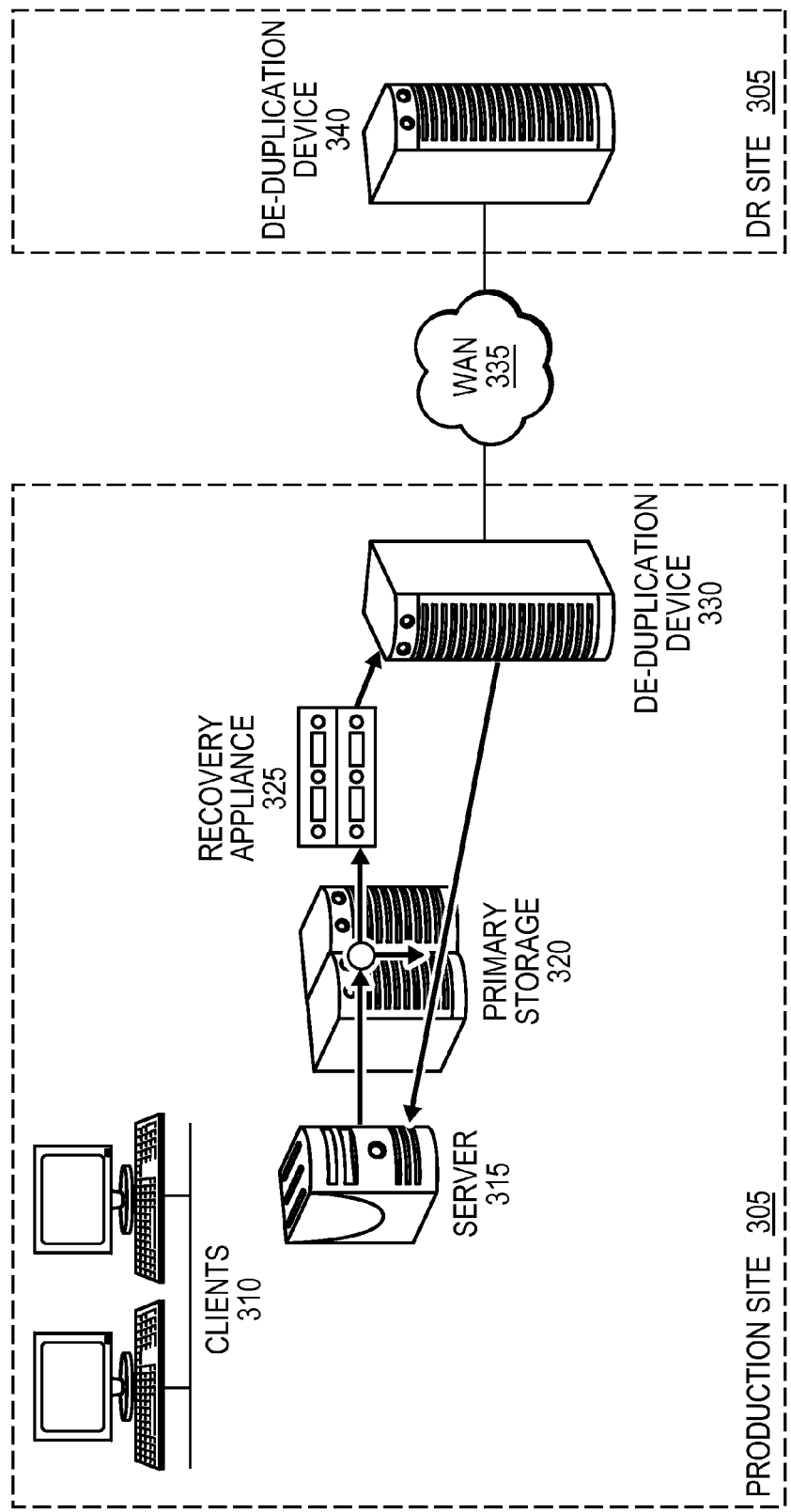
FIG. 3 is a simplified illustration of a production site and a data replication site, in accordance with an embodiment of the present disclosure.

Refer now to the example embodiment of FIG. 3. In the example embodiment of FIG. 3 there is a production site 305 and a data recovery site 345. Production site has clients 310 which interact with server 315. Server 315 may store data on primary storage 320. The data stored on primary storage 320 may have may be replicated by recovery appliance 325. Recovery appliance 325 may communicate the data to back-up de-duplication device 330. De-duplication device 330 may transmit the data to de-duplication device 340 at disaster recover site 345 via WAN 335. De-duplication devices 330 and 345 may de-duplicate the data, that is, only store redundant portions of the data once. In an embodiment recovery appliance 325 may have a consistency group, and the consistency group may consist of a group of volumes. In some embodiments, it may be desirable to send this information to the de-duplication device. In certain embodiments, it may be desirable for this data to be in an application consistent state.

In some embodiment, an application consistent state may be created by pausing or quiesing the applications. In most embodiments, the de-duplication device may archive the snapshots sent to the data de-duplication device.

Figure 4A:
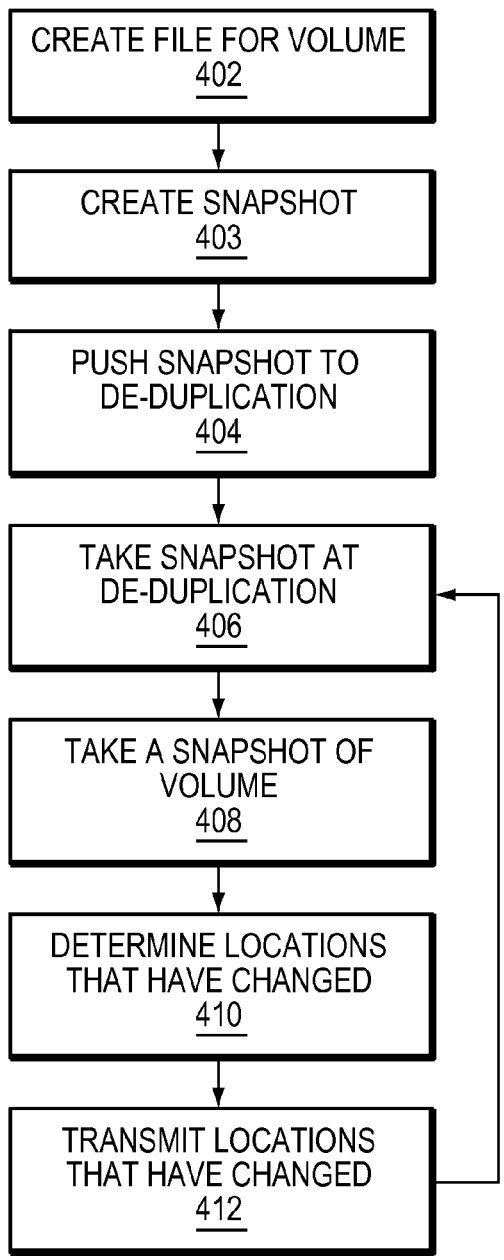
FIG. 4a is a simplified method for taking snapshots for a de-duplication device, in accordance with an embodiment of the present disclosure.

Refer now to the example embodiments of FIG. 3 and FIG. 4a. Replication device 325 may create files for each volume in the consistency group on de-duplication device 330 (step 402), each file has the size of the replicated LUN. Replication device 325 may create an application consistent snapshot of the data on storage 320 (step 403) Replication device may send the data on storage 320 to de-duplication device 330 (step 404). De-duplication device 330 may have a copy of the data stored on storage device 320 and make take a snapshot of the data (step 406) at the de-duplication device, note in some embodiments both storage array and de-duplication device may provide snapshots. Storage 320 may periodically quiese any application and take an application consistent snapshot of the data on storage 320 (step 408). In some embodiments, the storage array 320 provides an API to get the list of differences between two snapshots. The replication device 325 reads the list of differences and then it read the locations which changed in the snapshot (step 410). Replication device 325 may send the changes to De-duplication device 330 (step 412). In certain embodiments, steps 406-412 may be repeated.

Figure 4B:
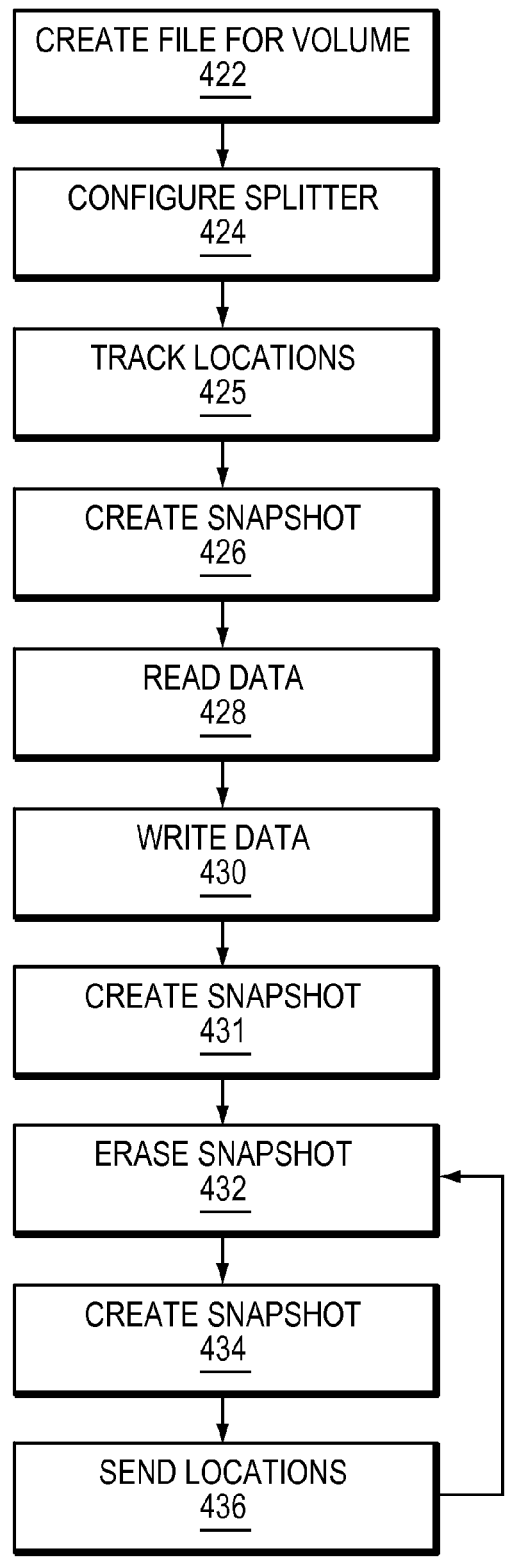
FIG. 4b is an alternative simplified method for taking snapshots for a de-duplication device, in accordance with an embodiment of the present disclosure.

Refer now to the example embodiments of FIG. 3 and FIG. 4b. The example embodiments of FIGS. 3 and 4b, illustrate pushing data from a storage which may not have an API to read the differences between snapshots. A file is created for each volume (step 422). A splitter in storage 320 is configured to split writes to DPA 325 or to send write meta data for each write to DPA 325 (step 424). DPA 325 tracks the locations of the IOs that arrive (step 425). A first snapshot is created at storage 320 (step 426). The data of the snapshot is read (step 428). The snapshot data is written to the file on de-duplication device 330 (step 430). A snapshot is created at the de-duplication device 330 (step 431). Snapshot is erased from storage array 320 (step 432). A new snapshot is created on storage array 320 (step 434). Based on the change list written by DPA 325, the locations that changed are sent to de-duplication device 330 (step 436). In some embodiments steps 431-436 are repeated. In other embodiments, the replication can be local replication such as in FIG. 3 or remote replication as exemplified in FIG. 8.

Figure 5:
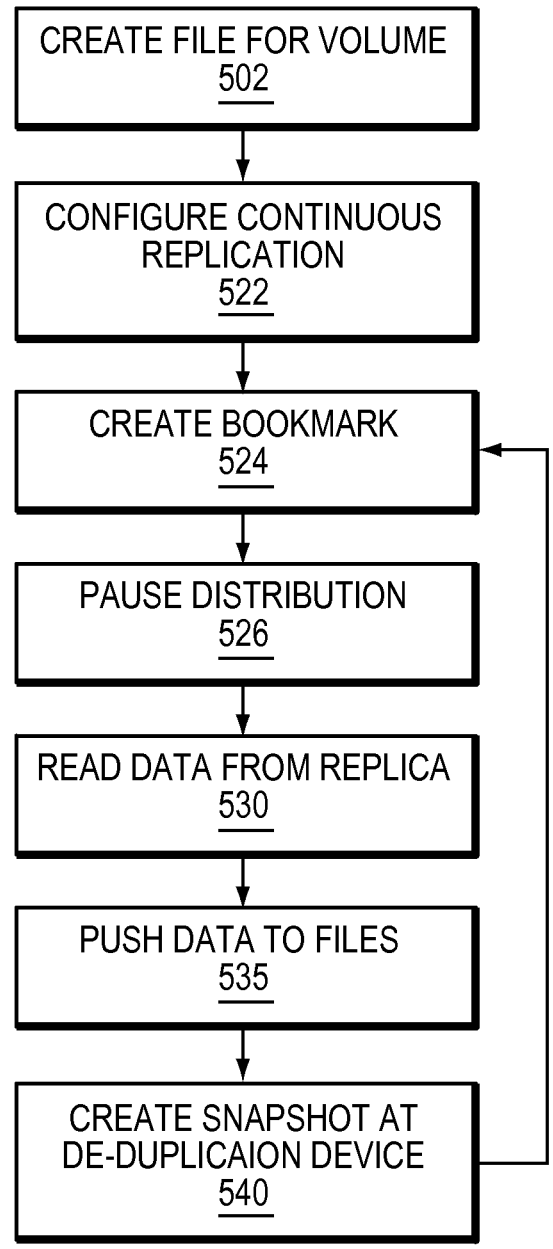
FIG. 5 is a further simplified method for taking snapshots for a de-duplication device, in accordance with an embodiment of the present disclosure.
Figure 8:
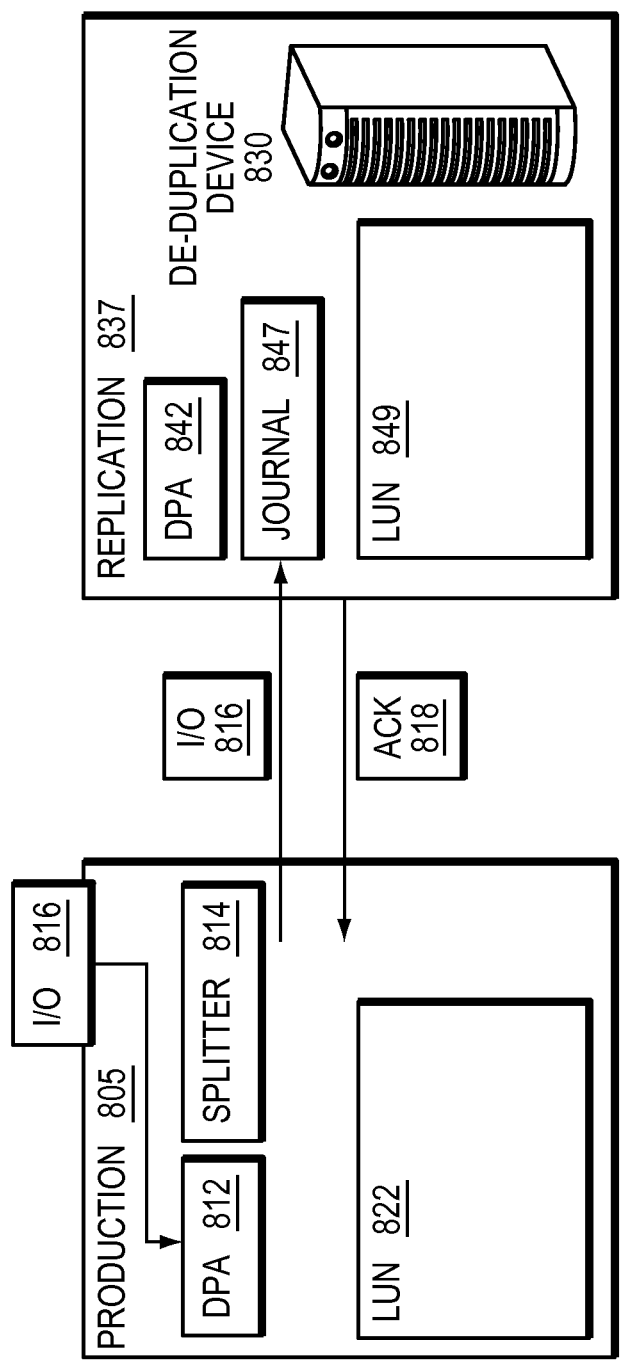
FIG. 8 is an alternative simplified illustration of a production site and a data replication site, in accordance with an embodiment of the present disclosure.

Refer now to the example embodiments of FIGS. 5 and 8. In this embodiment, a consistent snapshot may be sent to the de-duplication device 830. A file is created on de-duplication device 830 for each volume being replicated (step 502). Continuous replication is enabled (step 522). An application consistent bookmark is created by quiescing any applications and creating a logical bookmark in the continuous replication stream (step 524). Distribution from journal 847 pauses when data of the application consistent bookmark is written to the replica volumes (step 526). Data is read from the replica volumes (step 530). Data for locations which have changed is pushed to the files in de-duplication device 830, if this is the first time data is pushed all locations are marked as changed (535). A snapshot is created at de-duplication device 830 (step 540). In certain embodiments, steps 524-540 may be repeated.

Figure 6:
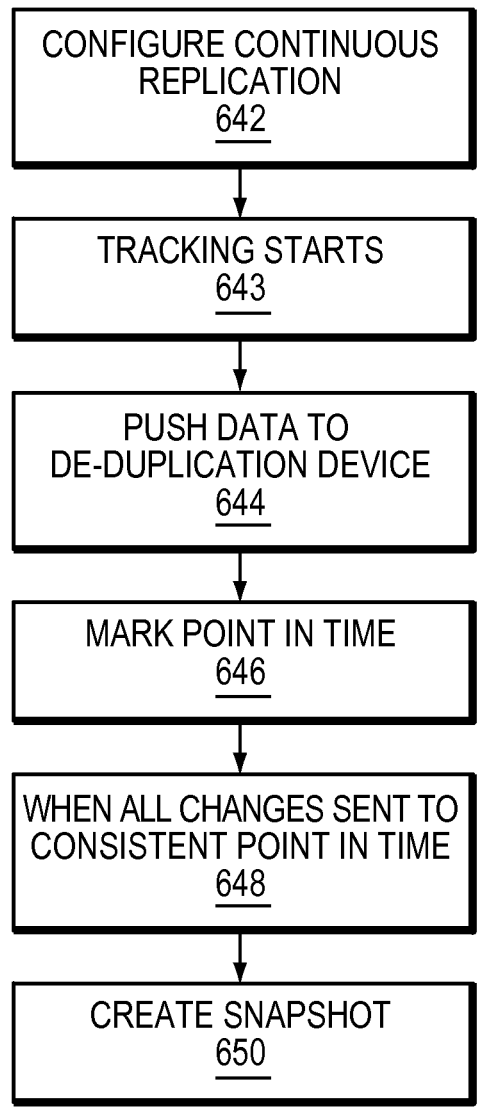
FIG. 6 is a simplified method for taking snapshots for a de-duplication device using changes between snapshots, in accordance with an embodiment of the present disclosure.

Refer now to the example embodiments of FIGS. 6 and 8. In this embodiment, the first snapshot may be sent to the de-duplication device without the snapshot being consistent. Continuous replication is enabled (step 642). Tracking starts at DPA 842 (643). All the data of the volumes being replicated on storage 820 is pushed to de-duplication device 830 (step 644) i.e. data from LUN 849 is pushed to de-duplication device 830. A logical bookmark is created by the continuous replication device 822 (step 646). When bookmark data is applied to the replica volume, replication is paused, locations marked as changed as tracking started are pushed from the volumes to the files on de-duplication device 830 (648). A snapshot is created on de-duplication device 830 (650).

Figure 7:
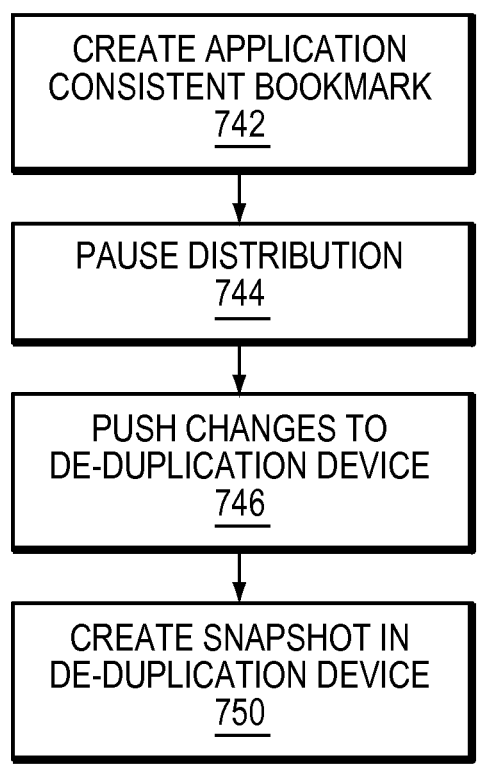
FIG. 7 is a simplified method for taking snapshots for a de-duplication device using changes between snapshots, in accordance with an embodiment of the present disclosure.

In certain embodiments, after creation of a snapshot, a method similar to the example embodiment of FIG. 7 may occur. Refer now to the example embodiments of FIGS. 7 and 8. In these embodiments, the changes to the snapshots may be pushed to the de-duplication device 830. An application consistent bookmark is created (step 742). Distribution is paused (step 744). The changes to the snapshot are pushed to de-duplication device 830 (step 746). When all changes are sent to the consistent point in time, a snapshot is created using the data in de-duplication device 830 (step 750).

In some embodiments, there may be different ways to get the list of changes from a paused snapshot. In particular embodiments, a journal of the replication may be configured to include all the data from the last time the snapshot was pushed. In these embodiments, the change list may be read from the meta data undo stream and the data until the last bookmark may be pushed to the de-duplication device may be a read and a map of the dirty locations created. In other embodiments, a change tracker may be created to track locations which changed at the replica volumes.

Accessing the Data

In certain embodiments, it may be desirable to recover data from the de-duplication device. In some embodiments, it may be desirable to recover a file at a given point in time. In other embodiments, it may be desirable to recover the full LUN or snap image from a given point of time.

Figure 9:
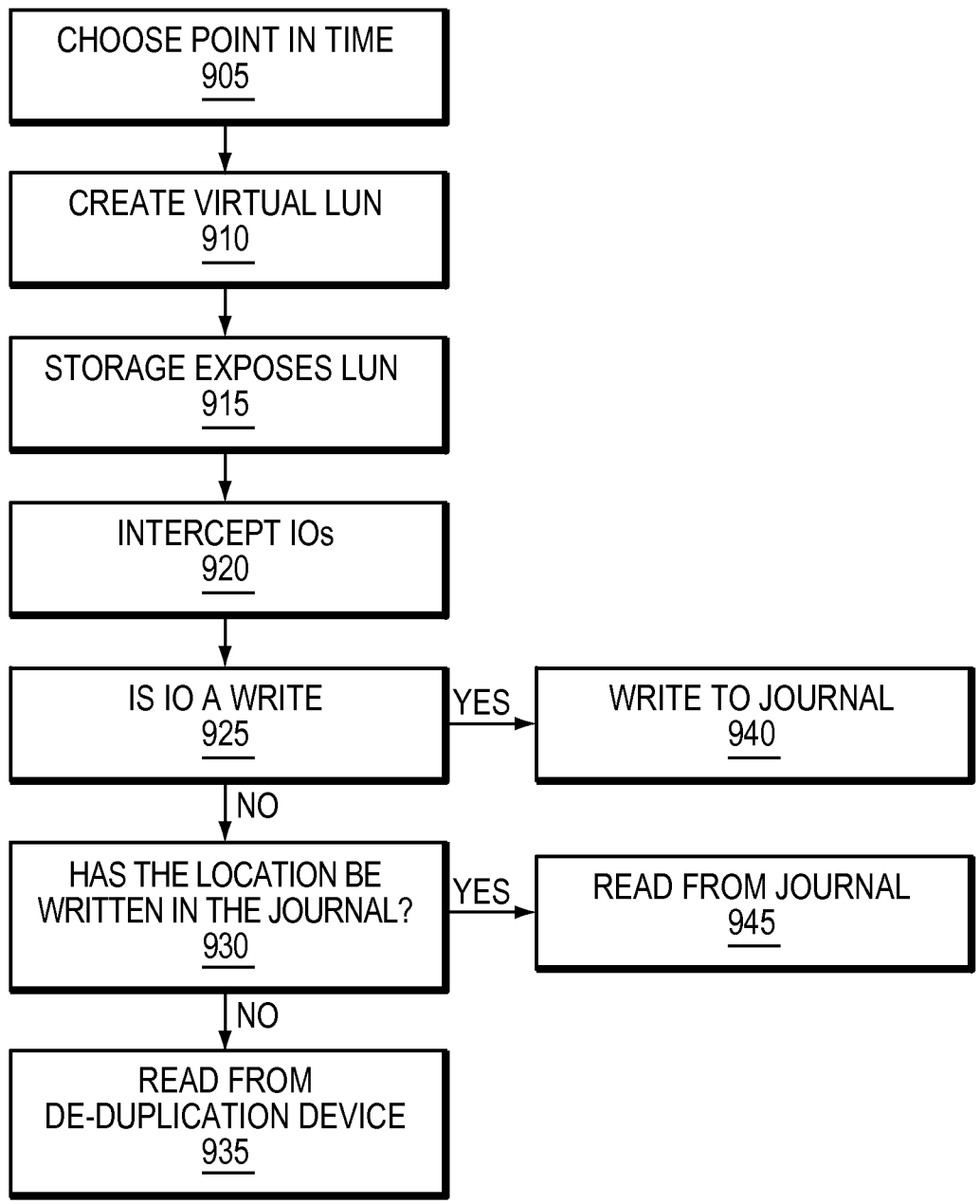
FIG. 9 is a simplified method for accessing a snapshot on a de-duplication device, in accordance with an embodiment of the present disclosure.

Refer now to the example embodiments of FIGS. 3 and 9. In these example embodiments a LUN is exposed. A point in time pushed to de-duplication device 330 is selected (step 905). Replication device 325 creates a virtual LUN (step 910). Storage array 320 exposed a new LUN to the user servers 315 (step 915). IOs arriving to the storage LUN are intercepted by a splitter in storage 320 and sent to DPA's 325 virtual LUN (step 920). A determination is made if the IO is a write IO (step 925). If the IO is a write IO, the IO is written to a journal in storage 320 (step 940). If the IOs are reads, DPA 325 checks if the read locations were written to the image access journal (step 930). If the data was written, then the IO is read from the journal (step 945). If the IO was not overwritten in the journal, the IO is read from de-duplication device 330 (step 935).

In other embodiments, if it is desired to recover a single file or object, a virtual machine is configured to consume the LUN exposed, the virtual machine may mount the LUN as a file system and may also run specific application from the device, like Microsoft exchange, and the replication system may read the file from the file system, or may restore an object like a mail box from the application (e.g. Microsoft exchange). In certain embodiments, the recovered data may be an e-mail. In at least some embodiments, the recovered data may be tables in a database. In other embodiments, if a file system may not be mounted to a virtual machine, a physical server enabled to access the file system may be configured to mount the file system or/and run the application from the LUs exposed, and the replication machine may recover the file from the mounted file system to a desired location, or may recover an object like a DB table of a mail box.

In some embodiments, to enable recovery of a single file, the data protection system may mount the files in the de-duplication device as described in FIG. 9 and a management layer located in the data protection appliance may create back-up catalog for all files that are being protected, a single file, a single DB table, or a single mailbox from the catalog may be recovered. In some embodiments, the data protection appliance code may run as a set of processes in the storage array or may run as a virtual machine. In certain embodiments, a full LUN may be recovered during a failover and the system may copy the data from the de-duplication device to a production LUN while the production LUN is being used.

Figure 10:
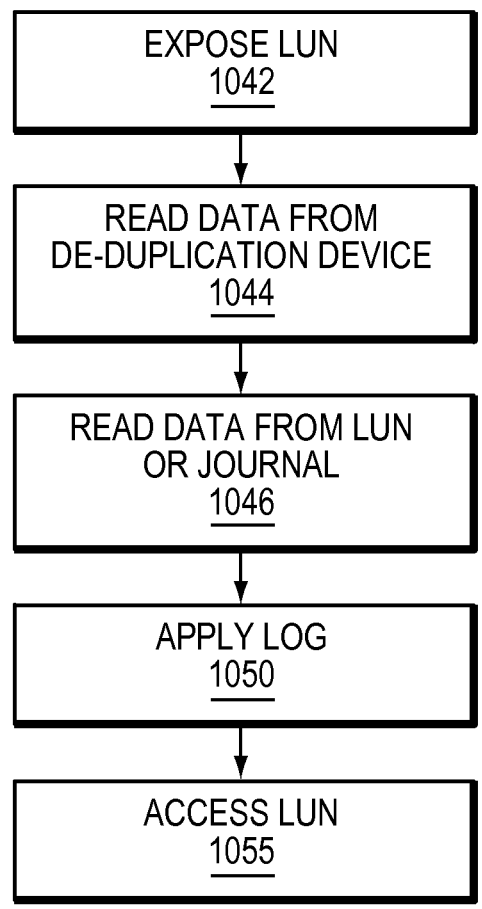
FIG. 10 is an alternative simplified method for accessing a snapshot on a de-duplication device, in accordance with an embodiment of the present disclosure.
Figure 11:
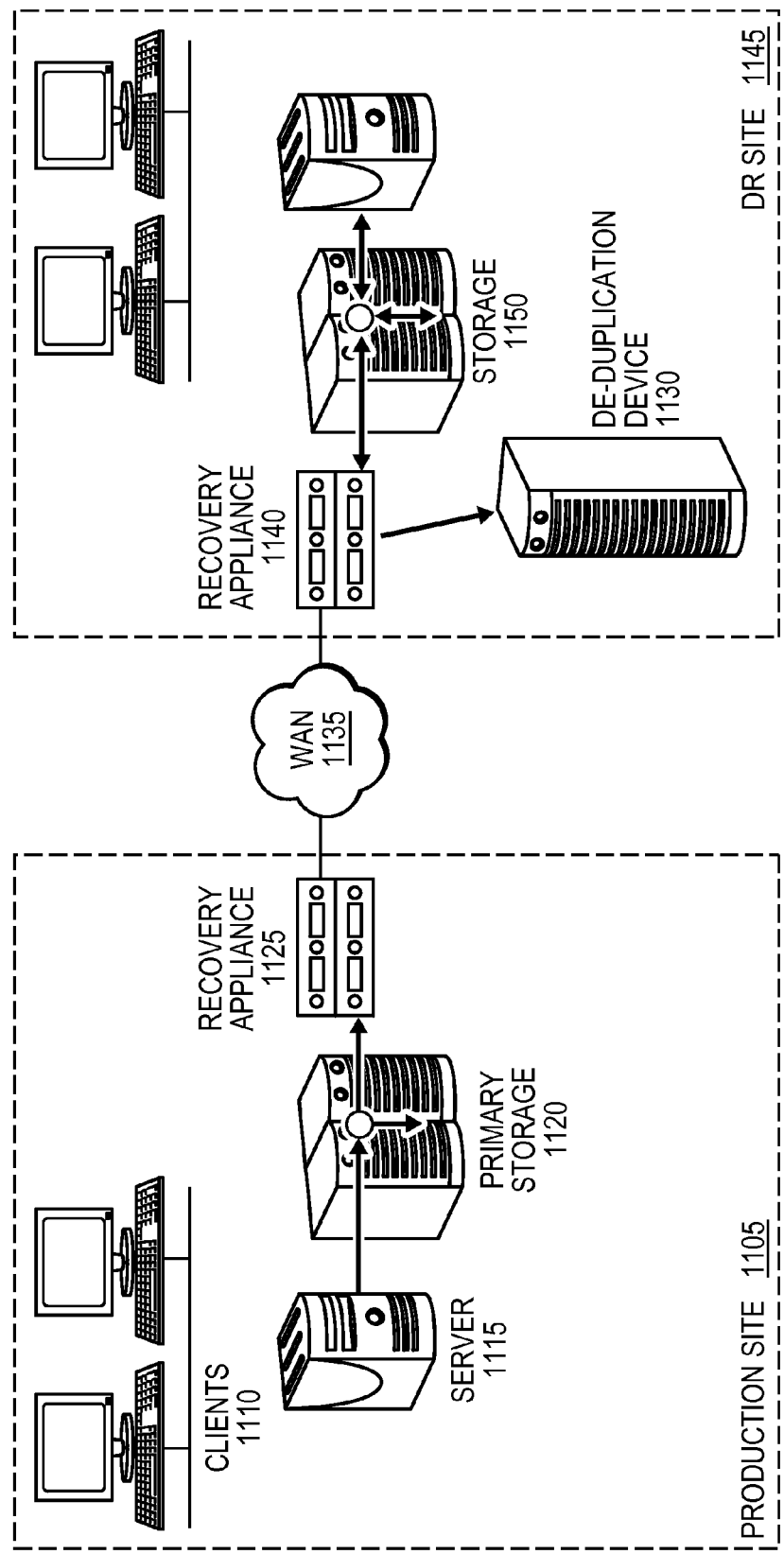
FIG. 11 is an alternative simplified illustration of a production site and a data replication site, in accordance with an embodiment of the present disclosure.

Refer now to the example embodiment of FIGS. 10 and 11. In the embodiment of FIG. 10, a LUN is exposed (step 1042). In some embodiments, such as FIG. 10, read and write IOs may be handled in a similar way to FIG. 9. In the embodiment of FIG. 10, a background process reads the data from the file exposed by the de-duplication device to the LUN (step 1044).

Once all data is read from de-duplication device 1130, new data may be read either from the LUN or the journal (step 1046). The log containing all the new IOs (the image access do journal) may be applied to the volume after data was copied from the file (step 1050). Once the all journal is rolled user may access the LUN directly, without going through data protection appliance 1130 (step 1055).

In other embodiments, data may be transferred from the DPA to the de-duplication device in different ways. In a first embodiment, data may be written to the files over the NFS protocol exposed by de-duplication device. In an alternative embodiment, a protocol may be used over IP between the de-duplication device and the replication device. In this embodiment, a list of the meta data of the changes and the changes themselves may be sent. In certain embodiments, this may enable the de-duplication device to optimize the writes. In some embodiments, the protocol may also be check if the locations suspected as changed are changed.

Figure 12:
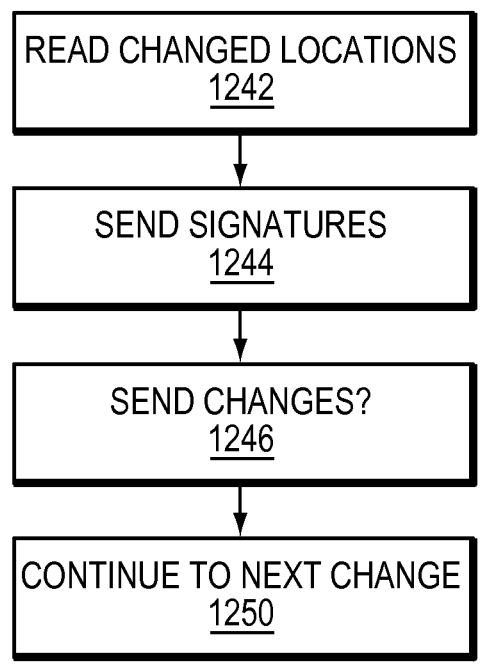
FIG. 12 is a simplified method for sending changes, in accordance with an embodiment of the present disclosure.

Refer now to the example embodiment of FIG. 12. The changed locations in the snapshot are read (step 1242). Signatures are sent to de-duplication device (step 1244). If data changed, the changes are sent to the de-duplication device (step 1246). A Snapshot is taken at the de-duplication device (step 1250). In some embodiments, The DPA may be a virtual machine. In other embodiments, the DPA may be a set of processes in the storage array. In further embodiments, the DPA may be in the de-duplication device.

Figure 13:
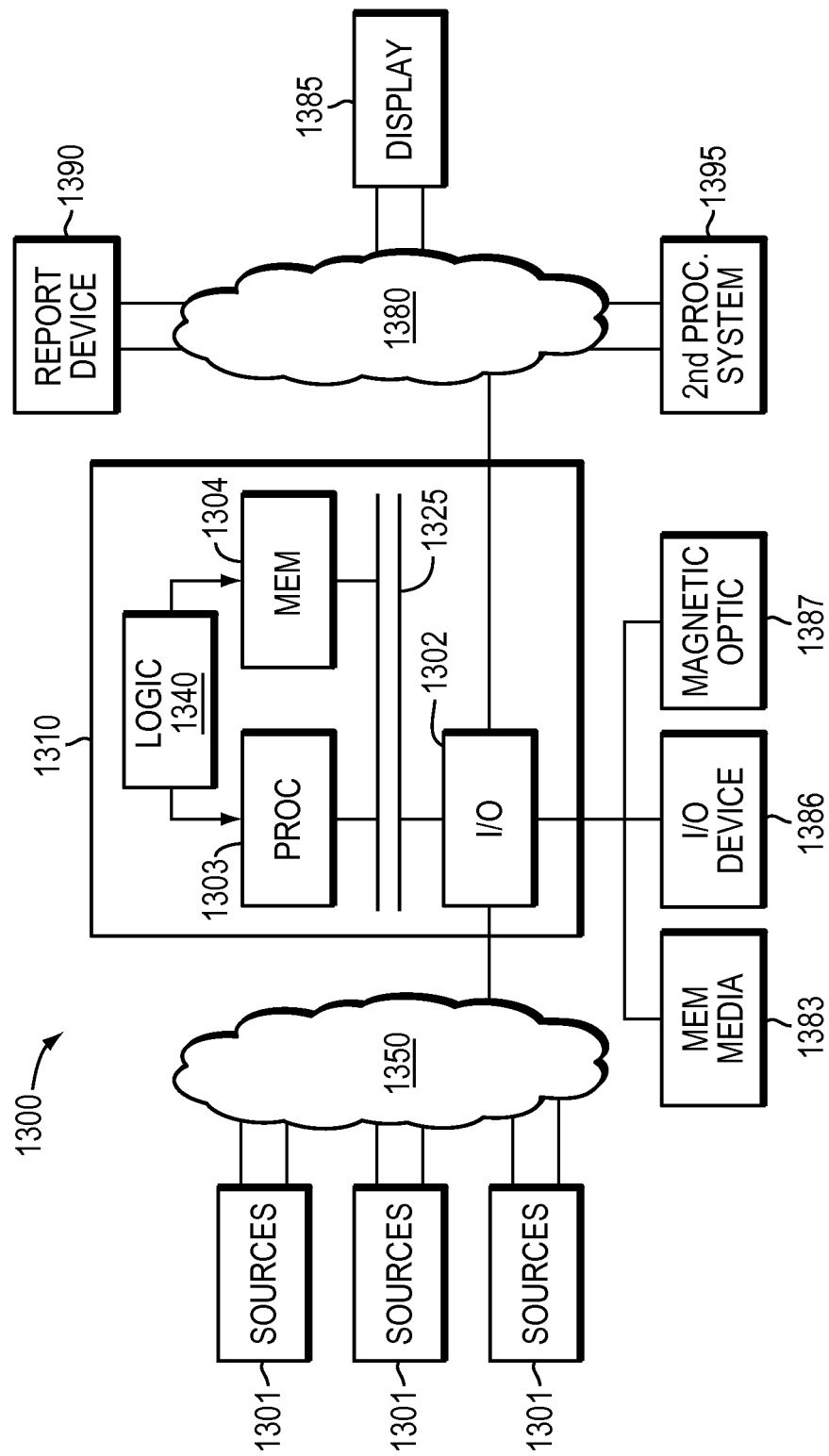
FIG. 13 is an example of an embodiment of an apparatus that may utilize the techniques described herein, in accordance with an embodiment of the present disclosure.
Figure 14:
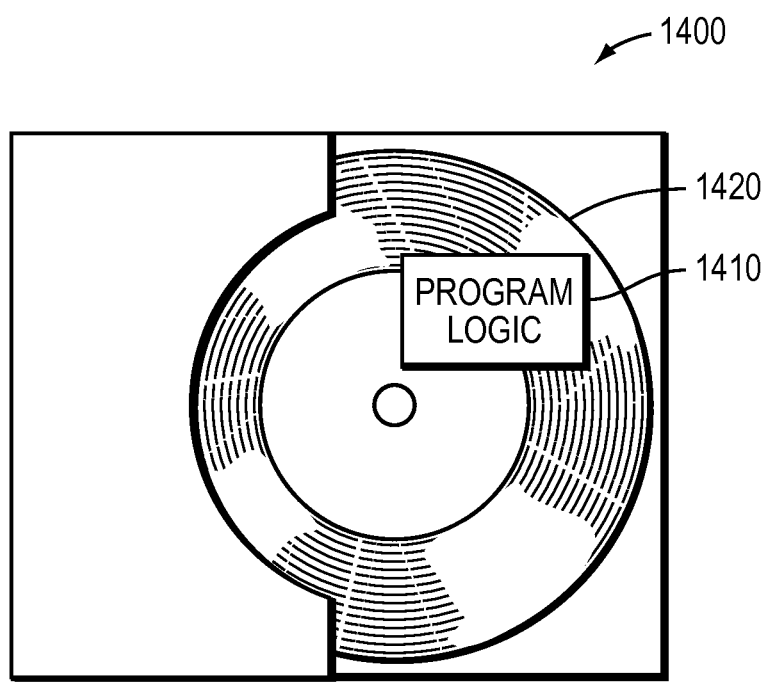
FIG. 14 is an example of an embodiment of a method embodied on a computer readable storage medium that may utilize the techniques described herein, in accordance with an embodiment of the present invention.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 14 shows Program Logic 1410 embodied on a computer-readable medium 1430 as shown, and wherein the Logic is encoded in computer-executable code configured for carrying out the reservation service process of this invention and thereby forming a Computer Program Product 1400. Logic 1340 of FIG. 13 may be loaded into memory 1304 and executed by processor 1430. Logic 1340 may also be the same logic 1410 on computer readable medium 1430.

The logic for carrying out the method may be embodied as part of the aforementioned system, which is useful for carrying out a method described with reference to embodiments shown in, for example, FIG. 3 and FIG. 4. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer implemented method for data replication, the method comprising:
    pushing a point in time (PIT) to a de-duplication device;
    creating a virtual logic unit number (LUN) based on the PIT pushed to the de-duplication device;
    exposing, via a Data Protection Appliance (DPA), the virtual LUN; and
    enabling read write IO access to the virtual LUN; wherein write IOs of the IOs are written to a journal associated with the virtual LUN; wherein a determination is made for each read IO of the IOs whether the data associated with the each read IO has been overwritten and is in the journal; and based on a determination the each read IO has been overwritten servicing the read IO from the journal and based on a determination the read IO has not been overwritten servicing the read IO from the de-duplication device.

2. The method of claim 1 further comprising:
    spawning a virtual machine (VM), wherein the VM contains an application; wherein the PIT is automatically mounted to the VM; and
    running the application; wherein running the application includes running a catalog service against data contained in the PIT.

3. The method of claim 2 wherein the catalog service is run from the spawned virtual machine and changes to the application are tracked in a database; wherein IOs to the virtual LUN are intercepted by a splitter.

4. The method of claim 3 wherein the application is selected from a group consisting of an e-mail application and a database application and the cataloged item is selected from the group consisting of an e-mail and a database table of the database application.

5. A computer implemented method for data replication, the method comprising:
    choosing an object in an image to be recovered at a point in time (PIT) of the image stored on a de-duplication device;
    spawning a virtual machine;

creating, using a replication device, a virtual logic unit number (LUN) based on the PIT on the de-duplication device; wherein the replication device creates a back-up catalog database for the files being protected on PIT image;

exposing the virtual LUN, via the replication device, to the virtual machine;

recovering the object from the PIT of the image mounted to the virtual machine; and un-exposing the virtual LUN to the virtual machine.

6. The method of claim 5 wherein a user searches for a change in the catalog database, wherein the database tracks changes to an application and the change corresponds to data to be recovered.

7. The method of claim 6 wherein the PIT corresponds to the change the user searched.

8. The method of claim 6 wherein the virtual LUN contains the data of the change the user requested; and wherein the method further comprises enabling read write IO access to the virtual LUN; wherein write IOs of the IOs are written to a journal associated with the virtual LUN; wherein a determination is made for each read IO of the IOs whether the data associated with the each read IO has been overwritten and is in the journal; and based on a determination the each read IO has been overwritten servicing the read IO from the journal and based on a determination the read IO has not been overwritten servicing the read IO from the de-duplication device.

9. The method of claim 7 further comprising:
running the application in the VM using the data with the change the user requested.

10. The method of claim 7 further comprising:
restoring the change the user requested from the VM to a different machine running the user application.

11. A computer program product for use in replication comprising:
a non-transitory computer readable medium encoded with computer executable program code for replication of data, the code configured to enable the execution of:
pushing a point in time (PIT) to a de-duplication device;
creating a virtual logic unit number (LUN) based on the PIT pushed to the de-duplication device; and
exposing, via a Data Protection Appliance (DPA), the virtual LUN; and
enabling read write IO access to the virtual LUN; wherein write IOs of the IOs are written to a journal associated with the virtual LUN; wherein a determination is made for each read IO of the IOs whether the data associated with the each read IO has been overwritten and is in the journal; and based on a determination the each read IO has been overwritten servicing the read IO from the journal and based on a determination the read IO has not been overwritten servicing the read IO from the de-duplication device.

12. The computer program product of claim 11 the code further configured to enable the execution of:
spawning a virtual machine (VM), wherein the VM contains an application; wherein the PIT is automatically mounted to the VM; and
running the application; wherein running the application includes running a catalog service against data contained in the PIT.

13. The computer program product of claim 12 wherein the catalog service is run from the spawned virtual machine and changes to the application are tracked in a database; wherein IOs to the virtual LUN are intercepted by a splitter.

14. The computer program product of claim 13 wherein the cataloged application is selected from a group consisting of an e-mail application and a database application and the cataloged item is selected from the group consisting of e-mails and database tables of a database of the database application.

15. A computer program product for use in replication comprising:
a non-transitory computer readable medium encoded with computer executable program code for replication of data, the code configured to enable the execution of:
choosing an object in an image to be recovered at a point in time (PIT) of the image stored on a de-duplication device;
spawning a virtual machine;
creating, using a replication device, a virtual logic unit number (LUN) based on the PIT on the de-duplication device; wherein the replication device creates a back-up catalog database for the files being protected on PIT image;
exposing the virtual LUN, via the replication device, to the virtual machine;
recovering the object from the PIT of the image mounted to the virtual machine; and
un-exposing the virtual LUN to the virtual machine.

16. The computer program product of claim 15 wherein a user searches for a change in catalog database, wherein the database tracks changes to an application and the change corresponds to data to be recovered.

17. The computer program product of claim 16 wherein the PIT corresponds to the change the user searched.

18. The computer program product of claim 16 wherein the virtual LUN contains the data of the change the user requested; and wherein the code further configured to enable the read write IO access to the virtual LUN; wherein write IOs of the IOs are written to a journal associated with the virtual LUN; wherein a determination is made for each read IO of the IOs whether the data associated with the each read IO has been overwritten and is in the journal; and based on a determination the each read IO has been overwritten servicing the read IO from the journal and based on a determination the read IO has not been overwritten servicing the read IO from the de-duplication device.

19. The computer program product of claim 17 the code further configured to enable the execution of:
running the application in the VM using the data with the change the user requested.

20. The computer program product of claim 17 further comprising:
restoring the change the user requested from the VM to a different machine running the user application.

21. The computer program product of claim 17 wherein the change requested by the user is to recovers an item selected from the group consisting of an e-mail and a database table.

* * * * *